(12) United States Patent
Suzuki

(10) Patent No.: US 6,499,096 B1
(45) Date of Patent: Dec. 24, 2002

(54) VLIW PROCESSOR FOR EXCHANGING AND INPUTTING SUB-INSTRUCTIONS TO CONTAINERS, AND CODE COMPRESSION DEVICE AND METHOD FOR COMPRESSING PROGRAM CODE

(75) Inventor: Hiroaki Suzuki, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/406,857

(22) Filed: Sep. 29, 1999

(30) Foreign Application Priority Data

Apr. 21, 1999 (JP) ............................................. 11-113459

(51) Int. Cl.$^7$ .............................. G06F 9/40; G06F 9/22
(52) U.S. Cl. ......................... 712/24; 712/212; 712/228; 711/125
(58) Field of Search ................................. 712/235, 245, 712/239, 204, 242, 243, 240, 200, 247, 210, 209, 215, 212, 23, 229, 24, 30, 41, 40, 227, 237, 225, 228; 709/213; 717/161, 158, 159, 131, 119; 701/29, 30; 700/31, 32, 33; 711/125

(56) References Cited

U.S. PATENT DOCUMENTS

| | | | | |
|---|---|---|---|---|
| 3,983,539 A | * | 9/1976 | Faber et al .................. | 712/247 |
| 5,475,824 A | | 12/1995 | Grochowski et al. ....... | 712/206 |
| 5,784,630 A | * | 7/1998 | Saito et al. ................. | 712/229 |
| 5,819,058 A | | 10/1998 | Miller et al. ................ | 712/210 |
| 5,893,143 A | * | 4/1999 | Tanaka et al. ............... | 701/1 |
| 5,930,508 A | * | 7/1999 | Faraboschi et al. ......... | 717/158 |

FOREIGN PATENT DOCUMENTS

| | | |
|---|---|---|
| EP | 0605927 A1 | 7/1994 |
| JP | 9-84004 | 3/1997 |

OTHER PUBLICATIONS

"A Dual–Issue RISC Processor for Multimedia Signal Processing", H. Sato et al., IEEE International Conference on Acoustics, Speech and Signal Processing (ICASSP), Los Alimitos, CA, IEEE Comp. Soc, Press, Apr. 21, 1997, p. 591–594.

"Delayed Instruction Execution on a Long Instruction Word (LIW) Computer", K. Kato et al., Systems & Computers in Japan, Scripta Technica Journals, New York, vol. 23, No. 14, 1992, p. 14–19.

European Search Reports, EP 00 10 8399, Jul. 19, 2000, EP93203688, Mar. 3, 1994.

"A Dual–Issue RISC Processor for Multimedia Signal Processing", H. Sato et al., IEICE Trans. Electron., vol. E81–C, No. 9, Sep. 1998, pp. 1374–1381.

"A 2V 250MHz Multimedia Processor", T. Yoshida et al., IEEE International Solid–State Circuits Conference, Feb. 7, 1997, pp. 266–267 and 471.

* cited by examiner

Primary Examiner—Daniel H. Pan
(74) Attorney, Agent, or Firm—McDermott, Will & Emery

(57) ABSTRACT

A VLIW processor includes a plurality of containers holding a plurality of sub-instructions in a VLIW instruction, an exchanging portion exchanging the plurality of sub-instructions held in the plurality of containers and inputting the instructions to the plurality of containers, a plurality of decoders decoding the sub-instructions held in the plurality of containers, and a plurality of processing units executing the sub-instructions decoded by the plurality of decoders. Since the exchanging portion exchanges a plurality of sub-instructions held in the plurality of containers and inputs the instructions to the plurality of containers, a compressed code can be executed in such an execution sequence that is taken prior to compression.

18 Claims, 11 Drawing Sheets

VLIW PROCESSOR FOR EXCHANGING AND INPUTTING SUB-INSTRUCTIONS TO CONTAINERS, AND CODE COMPRESSION DEVICE AND METHOD FOR COMPRESSING PROGRAM CODE

BACKGROUND OF THE INVENTION

1. Field of the Invention

The present invention relates to VLIW (Very Long Instruction Word) processors and more particularly to a VLIW processor which executes a compressed program code, a code compression device which compresses a program code, a code compression method, and a medium on which a code compression program is recorded.

2. Description of the Background Art

There have been increasing demands for improved processor performance in various fields such as multimedia processing and high resolution image processing. However, the current LSI (Large Scale Integration) manufacturing technique has a limit in attaining higher device speed. Therefore, VLIW processors have been drawing attention and actively researched and developed.

The VLIW processor which contains a plurality of processing units aims to improve the performance of a program-controlled processor by executing a plurality of instructions in the same cycle and thus increasing parallelism. In the VLIW processor, a processing unit corresponding to an instruction field is predetermined and therefore not all the instruction slots are filled with valid instructions. Thus, a nop (no operation) instruction, as an invalid instruction, is inserted in a code, resulting in the essential problem of low code density.

The VLIW processor in which two instructions are simultaneously issued cannot simultaneously execute "load mem (100)→R1" and "add R1, R2→R3" as shown in code example 1 below.

Code Example 1

| code number | instruction sequence for left sub-instructions | instruction sequence for right sub-instructions |
|---|---|---|
| 1 | store R0 → mem (200) | :sub R4, R5 → R6 |
| 2 | load mem (100) → R1 | :nop |
| 3 | nop | :add R1, R2 → R3 |

Since one of them is an instruction to load a value to a register R1 and the other is an instruction to refer to the value of the same register R1, the instructions cannot be executed at the same time. In this case, a nop instruction is inserted as shown in code example 1. In the following description, a long instruction formed by combining two instructions is called a VLIW instruction and each instruction included in the VLIW instruction (load, nop and add instructions in code example 1) is called a sub-instruction.

Inventions disclosed in H. Sato, T. Yoshida, M. Matsuo, T. Kengaku and K. Tsuchihashi; "A Dual-Issue RISC Processor for Multimedia Signal Processing," IEICE Trans. Electron., vol. E81-C, No. 9, September 1998 and Japanese Patent Laying-Open No. 9-84004 aim to solve the problem above. According to these inventions, code compression is carried out by separating a VLIW instruction, which includes instructions to be executed originally at the same time, into two sub-instructions and executing the sub-instructions. In other words, "load mem (100)→R1" and "add R1, R2→R3" are described as one VLIW instruction, and the VLIW instruction is divided into two cycles during execution to separately execute the sub-instructions as shown in code example 2 below.

Code Example 2

| code number | instruction sequence for left sub-instructions | instruction sequence for right sub-instructions |
|---|---|---|
| 1 | store R0 → mem (200) | :sub R4, R5 → R6 |
| 2 | load mem (100) → R1 | :add R1, R2 → R3 |

For this operation, FM (Format-Specifying) bits are assigned to lower order two bits of the 32-bit VLIW instruction, and the instruction is executed by processor in the following manner according to the FM bit pattern.

(1) FM=00: simultaneously execute two sub-instructions
(2) FM=01: execute the left sub-instruction and then execute the right sub-instruction
(3) FM=10: execute the right sub-instruction and then execute the left sub-instruction
(4) FM=11: execute two sub-instructions by regarding the two sub-instructions as one long instruction Since the operation mode in the case of FM=11 is irrelevant to the present invention, it will not be described in detail. FIG. 1 schematically shows relations between FM bits and instruction execution.

Code example 1 is described as code example 3 below.

Code Example 3

| code number | FM | instruction sequence for left sub-instructions | instruction sequence for right sub-instructions |
|---|---|---|---|
| 1 | 00 | store R0 → mem (200) | :sub R4, R5 → R6 |
| 2 | 01 | load mem (100) → R1 | :add R1, R2 → R3 |

In executing code example 3, a processor executes instructions as shown in execution sequence example 1.

Execution Sequence Example 1

| step number | instruction sequence for left sub-instructions | instruction sequence for right sub-instructions |
|---|---|---|
| 1 | store R0 → mem (200) | :sub R4, R5 → R6 |
| 2 | load mem (100) → R1 | : |
| 2' |  | :add R1, R2 → R3 |

In the 2nd cycle, an arithmetic unit corresponding to the add instruction assumes the non-operation state and carries out substantially the same operation as execution of the nop instruction. In the 2'nd cycle, an arithmetic unit corresponding to the load instruction assumes the non operation state and carries out substantially the same operation as execution of the nop instruction. Therefore, execution sequence example 1 is equivalent to execution of code example 1. Since instructions are stored in an instruction memory in the format of code example 3, they are compressed to 2/3 times the capacity compared with code example 1.

In the conventional VLIW processor above, the order of describing sub-instructions can be determined more freely and the code density can be improved by adding FM bits to a VLIW instruction. Since the FM bits are assigned to two bits of an instruction field, however, the number of instruction types is limited. Further, instructions need to be mapped prior to instruction decoding, which increases circuit delay.

SUMMARY OF THE INVENTION

An object of the present invention is to provide a VLIW processor capable of processing a compressed program in such an execution sequence that is taken prior to compression without assigning special bits to an instruction field.

Another object of the present invention is to provide a VLIW processor, which corresponds to the VLIW method of at least 3-ways, capable of processing a compressed program in such an execution sequence that is taken prior to compression.

Still another object of the present invention is to provide a VLIW processor, which corresponds to the 2n-way VLIW method, capable of processing a compressed program in such an execution sequence that is taken prior to compression.

Still another object of the present invention is to provide a code compression device capable of compressing a program described by a VLIW instruction.

Still another object of the present invention is to provide a code compression method capable of compressing a program described by a VLIW instruction.

Still another object of the present invention is to provide a medium on which a code compression program capable of compressing a program described by a VLIW instruction is recorded.

According to one aspect of the present invention, a VLIW processor includes a plurality of containers, an exchanging portion exchanging a plurality of sub-instructions and inputting the instructions to the plurality of containers, a plurality of decoders connected to the plurality of containers, and a plurality of processing units connected to the plurality of decoders.

Since the exchanging portion exchanges a plurality of sub-instructions and inputs them to the plurality of containers, a compressed code can be executed in such an execution sequence that is taken prior to compression.

According to another aspect of the present invention, a code compression device includes an extracting portion extracting consecutive VLIW instructions from a source code, and a compressing portion compressing the consecutive VLIW instructions based on a nop instruction included in the consecutive VLIW instructions extracted by the extracting portion.

Since the compressing portion compresses the consecutive VLIW instructions based on a nop instruction included in the consecutive VLIW instructions extracted by the extracting portion, a program described by a VLIW instruction can be compressed.

According to still another aspect of the present invention, a code compression method includes the steps of extracting consecutive VLIW instructions from a source code, and compressing the consecutive VLIW instructions based on a nop instruction included in the extracted consecutive VLIW instructions.

Since the consecutive VLIW instructions are compressed based on a nop instruction included in the consecutive VLIW instructions from a source code, a program described by VLIW instruction can be compressed.

According to still another aspect of the present invention, a code compression program recorded on a medium includes the steps of extracting consecutive VLIW instructions from a source code, and compressing the consecutive VLIW instructions based on a nop instruction included in the consecutive VLIW instructions.

Since the consecutive VLIW instructions are compressed based on a nop instruction included in the consecutive VLIW instructions from a source code, a program described by a VLIW instruction can be compressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

A VLIW processor in a first embodiment of the present invention will be described in the following. Terms used in this embodiment will be described first. A "main cycle" refers to a cycle when an instruction is issued, that is, a cycle in which step numbers are indicated only by numerals in an execution sequence. A "sub cycle" refers to a cycle executed one cycle after the main cycle, that is, a cycle in which step numbers are indicated by numerals with dashes (') in an execution sequence. The sub cycle is not always executed after the main cycle.

A "left container" refers to the left one of instruction buffers in which VLIW instructions are placed. A "left instruction decoder" refers to a decoder which decodes an instruction placed in the left container. A "left processing unit" refers to a processing unit which executes the instruction decoded by the left instruction decoder. A "left sub-instruction" belongs to an instruction sequence for left sub-instructions, that is, an instruction which is predetermined to be processed in the left processing unit.

A "right container" refers to the right one of instruction buffers in which VLIW instructions are placed. A "right instruction decoder" refers to a decoder which decodes an instruction placed in the right container. A "right processing unit" refers to a processing unit which executes the instruction decoded by the right instruction decoder. A "right sub-instruction" belongs to an instruction sequence for right sub-instructions, that is, an instruction which is predetermined to be processed in the right processing unit.

Figure 1:
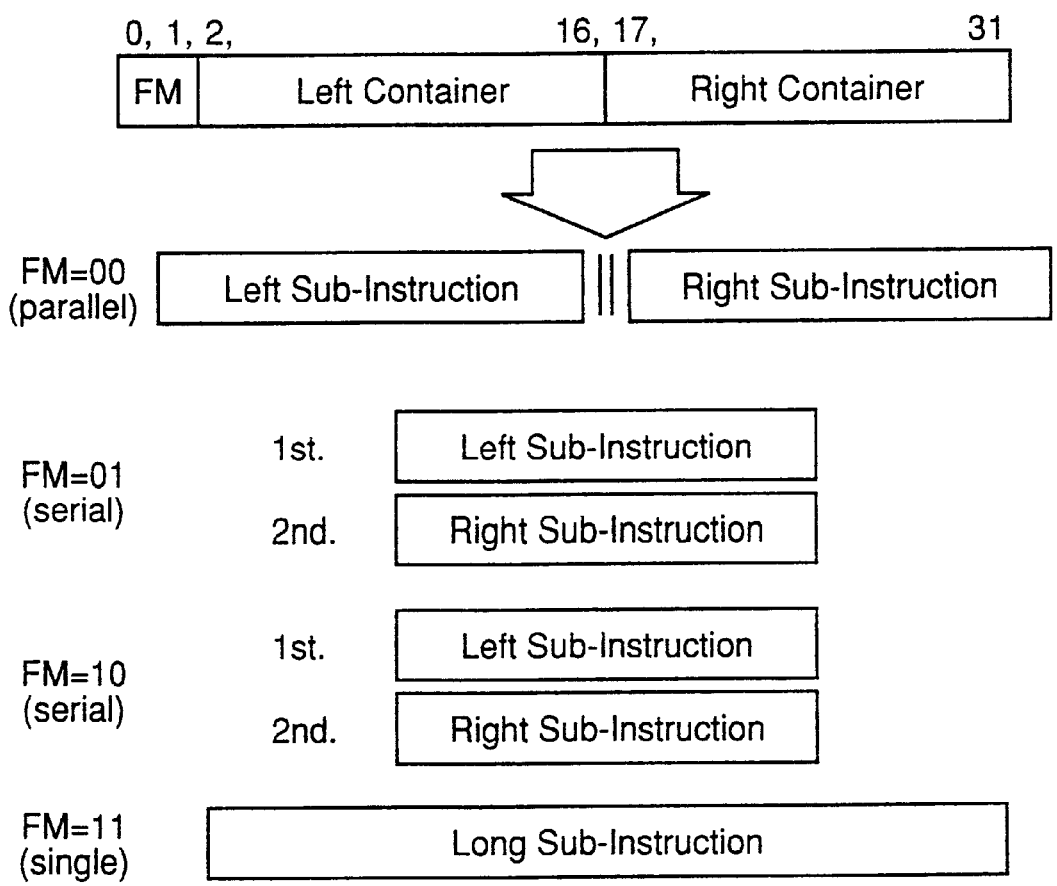
FIG. 1 schematically shows relations between FM bits used in a conventional VLIW method and instruction execution.
Figure 2:
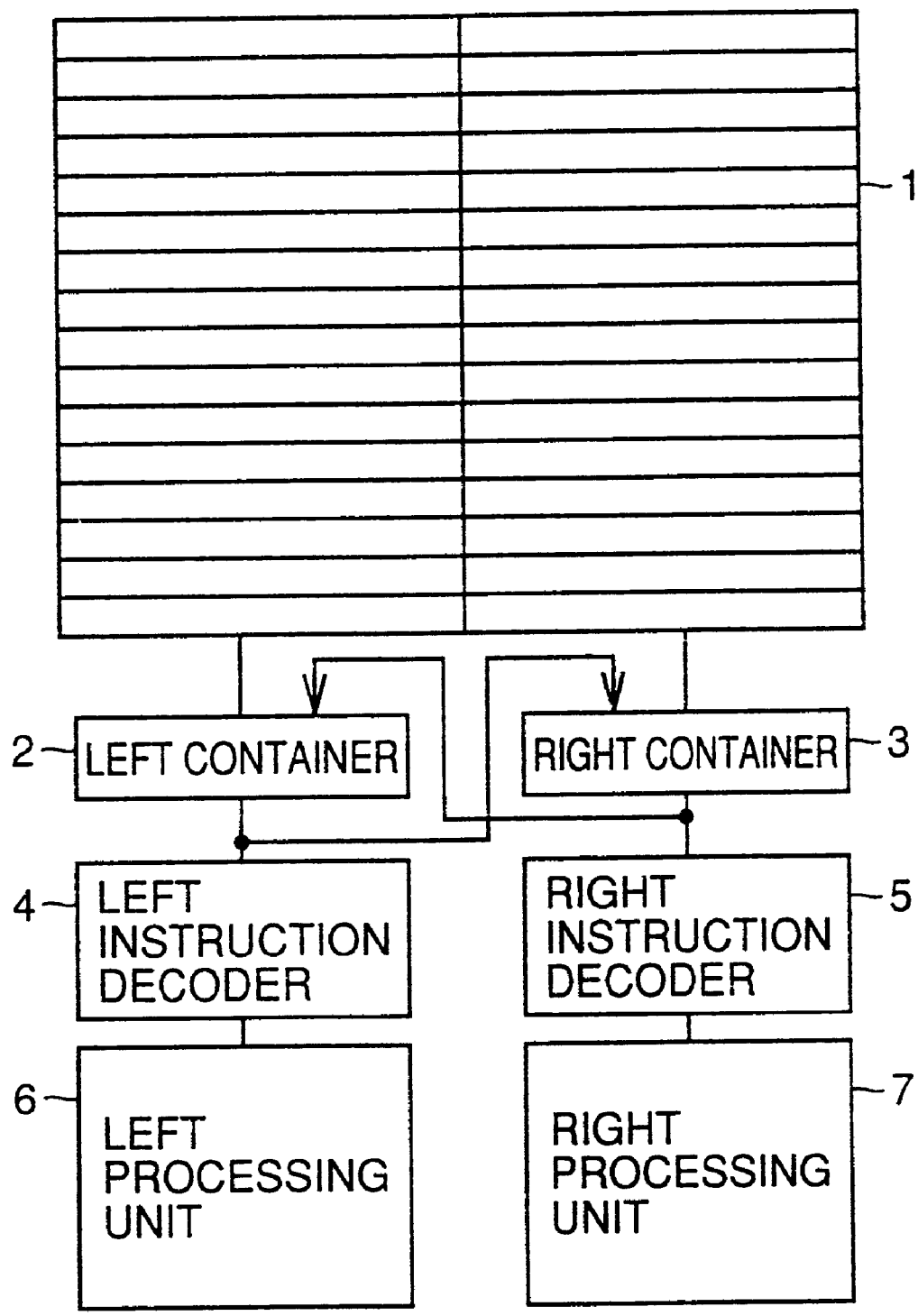
FIG. 2 schematically shows a VLIW processor in a first embodiment.

FIG. 2 schematically shows a VLIW processor in this embodiment. The VLIW processor includes an instruction memory 1, a left container 2, a light container 3, a left instruction decoder 4, a right instruction decoder 5, a left processing unit 6, and a right processing unit 7. As shown in FIG. 2, left and right containers 2 and 3 perform a swapping operation to exchange their sub-instructions.

The processing rule of VLIW instructions will be described in the following.

(1) When a left sub-instruction 1 is issued to the left container and a light sub-instruction 2 is issued to the right container, these two sub-instructions are simultaneously transferred to corresponding instruction decoders. In the main cycle, the sub-instructions are decoded by the decoders and simultaneously executed by corresponding processing units. In this case, a sub cycle is not caused.

(2) When a left sub-instruction 3 is issued to the left container and a left sub-instruction 4 is issued to the right container, these two sub-instructions are simultaneously transferred to corresponding instruction decoders. In the main cycle, left sub-instruction 3 is decoded by the left decoder and executed in the left processing unit. Meanwhile, the right decoder fails to decode left sub-instruction 4 and deals with it as a nop instruction because it is invalid, and left sub-instruction 4 is not processed in the right processing unit. At the same time, existence of the instruction associated with the instruction sequence for left sub-instructions is detected in the right container, and the contents of the left and right containers are exchanged.

In the sub cycle, left sub-instruction 4 is decoded by the left decoder and executed in the left processing unit. Meanwhile, the right decoder fails to decode left sub-instruction 3 and deals with it as a nop instruction because it is invalid, and left sub-instruction 3 is not processed in the right processing unit. That is, a VLIW instruction which includes left sub-instruction 3 and a right nop instruction is executed in the main cycle, and a VLIW instruction which includes left sub-instruction 4 and a right nop instruction is executed in the sub cycle.

(3) When a right sub-instruction 5 is issued to the left container and a right sub-instruction 6 is issued to the right container, these two sub-instructions are simultaneously transferred to corresponding instruction decoders. In the main cycle, right sub-instruction 6 is decoded by the right decoder and executed in the right processing unit. Meanwhile, the left decoder fails to decode right sub-instruction 5 and deals with it as a nop instruction because it is invalid, and right sub-instruction 5 is not processed in the left processing unit. At the same time, existence of the instruction associated with the instruction sequence for right sub-instructions is detected in the left container, and the contents of the left and right containers are exchanged.

In the sub cycle, right sub-instruction 5 is decoded by the light decoder and executed in the right processing unit. Meanwhile, the left decoder fails to decode right sub-instruction 6 and deals with it as a nop instruction because it is invalid, and right sub-instruction 6 is not processed in the left processing unit. That is, a VLIW instruction which includes right sub-instruction 6 and a left nop instruction is executed in the main cycle, and a VLIW instruction which includes right sub-instruction 5 and a left nop instruction is executed in the sub cycle.

(4) When a right sub-instruction 7 is issued to the left container and a left sub-instruction 8 is issued to the right container, these two sub-instructions are simultaneously transferred to corresponding instruction decoders. In the main cycle, the left decoder fails to decode light sub-instruction 7 and deals with it as a nop instruction because it is invalid, and light sub-instruction 7 is not processed in the left processing unit. Meanwhile, the right decoder fails to decode left sub-instruction 8 and deals with it as a nop instruction because it is invalid, and left sub-instruction 8 is not processed in the right processing unit. At the same time, existence of the instruction associated with the instruction sequence for right sub-instructions is detected in the left container, and existence of the instruction associated with the instruction sequence for left sub-instructions is detected in the right container. Thus, the contents of the left and right containers are exchanged.

In the sub cycle, right sub-instruction 7 is decoded by the right decoder and executed in the right processing unit. Meanwhile, left sub-instruction 8 is decoded by the left decoder and executed in the left processing unit. That is, a VLIW instruction which includes a right nop instruction and a left nop instruction is executed in the main cycle, and a VLIW instruction which includes right sub-instruction 7 and left sub-instruction 8 is executed in the sub cycle.

Figure 3:
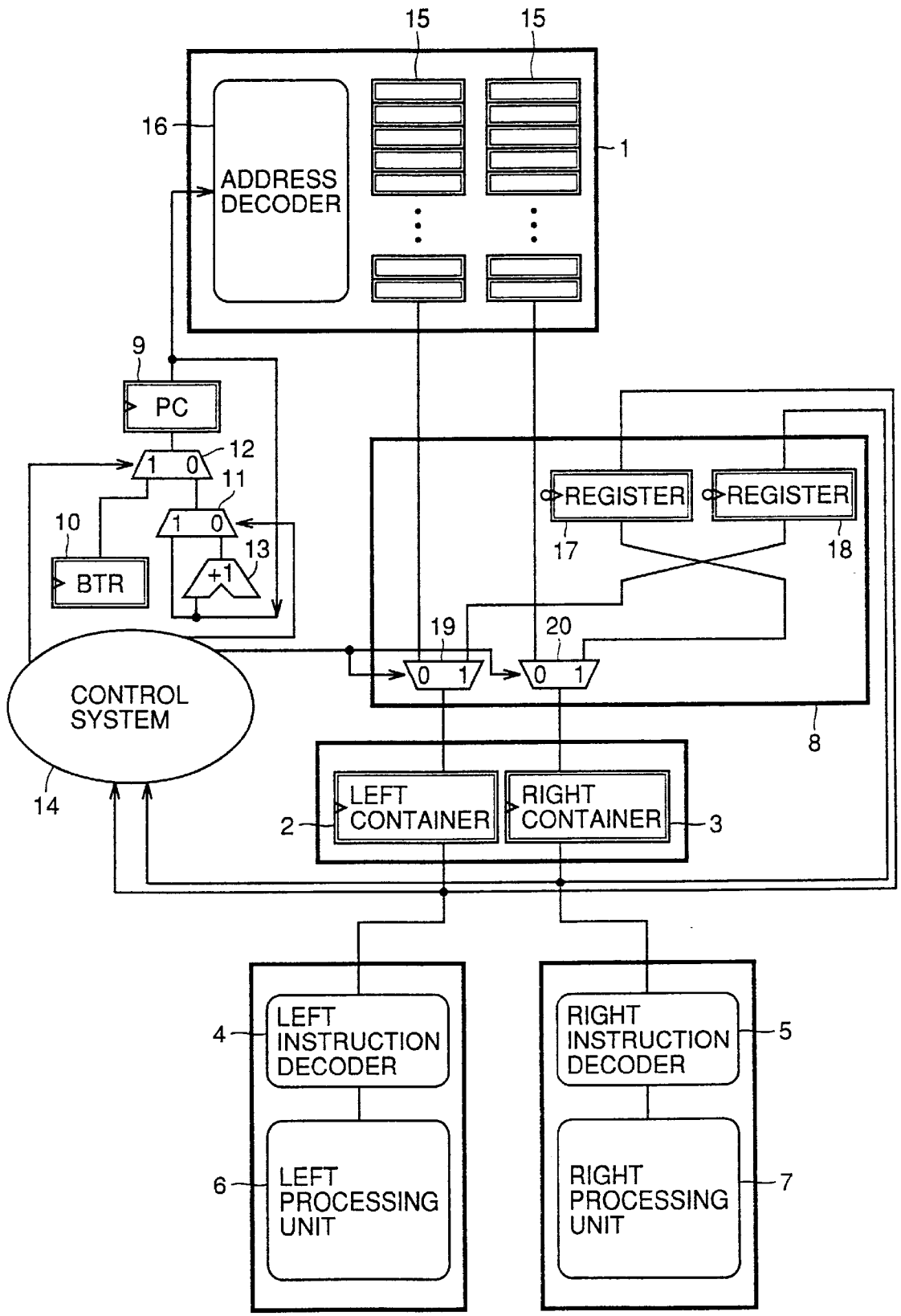
FIG. 3 is a block diagram showing a schematic structure of the VLIW processor in the first embodiment.

FIG. 3 is a block diagram showing a schematic structure of the VLIW processor in this embodiment. The VLIW processor includes an instruction memory 1, a left container 2, a right container 3, a left instruction decoder 4, a right instruction decoder 5, a left processing unit 6, a right processing unit 7, an exchanging portion 8 which exchanges the contents of left and right containers 2 and 3, a program counter 9, a branch target register (BTR) 10, selectors 11 and 12, an incrementer 13, and a control system 14 which controls the entire processor. Instruction memory 1 includes a plurality of memory cells 15, and an address decoder 16 which decodes the contents of program counter 9 to select memory cell 15. Exchanging portion 8 includes a register 17 which holds the contents of left container 2, a register 18 which holds the contents of right container 3, and selectors 19 and 20.

Left container 2, right container 3, program counter 9 and branch target register 10 hold input signals at a rise of a clock signal not shown. Registers 17 and 18 hold input signals at a fall of the clock signal. When left and right containers 2 and 3 hold sub-instructions from instruction memory 1 in one cycle, therefore, they can exchange and receive the sub instructions in the next cycle.

For main cycle processing, control system 14 controls so that selector 11 selects the output of incrementer 13, selector 12 selects the output of selector 11 and selectors 19 and 20 select the outputs of instruction memory 1. For sub cycle processing, control system 14 controls so that selector 11 selects the outputs of program counter 9, selector 12 selects the output of selector 11 and selectors 19 and 20 select the outputs of registers 18 and 17, respectively.

In writing operation to program counter 9 shown in FIG. 3, it is controlled so that the output of branch target register 10 is given priority over the output of incrementer 13. This is because programmers coded instructions while a nop instruction is inserted as in code example 1 described in the prior art and therefore if branching is found before the cycle of code number 3, the branch has to be given priority without executing "add R1, R2→R3" as a sub cycle.

It is assumed as an example that a programmer made the program of code example 4 below. code example 4

| code number | instruction sequence for left sub-instructions | instruction sequence for right sub-instructions |
|---|---|---|
| 1 | store R0 → mem (200) | :nop |
| 2 | load mem (100) → R1 | :nop |
| 3 | shift R4, R5 → R6 | :add R1, R2 → R3 |

This code example 4 program is converted into code example 5 below by a code compression algorithm described below. code example 5

| code number | instruction sequence for left sub-instructions | instruction sequence for right sub-instructions |
|---|---|---|
| 1 | store R0 → mem (200) | :load mem (100) → R1 |
| 2 | shift R4, R5 → R6 | :add R1, R2 → R3 |

When the VLIW processor in this embodiment executes the code example 5 program, the execution sequence is as follows.
Execution Sequence Example 2

| step number | instruction sequence for left sub-instructions | instruction sequence for right sub-instructions |
|---|---|---|
| 1 | store R0 → mem (200) | :nop [load mem (100) → R1] |
| 1' | load mem (100) → R1 | :nop [store R0 → mem (200)] |
| 2 | shift R4, R5 → R6 | :add R1, R2 → R3 |

Here, "nop [load mem (100)→R1]" means that when a left sub-instruction "load mem (100)→R1" is issued to the instruction sequence for right sub-instructions, the instruction is processed as a nop instruction. Hereinafter, the description of "nop [ ]" means that when a right sub-instruction is issued to the instruction sequence for left sub-instructions or when a left sub-instruction is issued to the instruction sequence for right sub-instructions, the instruction is processed as a nop instruction.

As described above, according to the VLIW processor in this embodiment, when a right sub-instruction is issued to the instruction sequence for left sub-instructions or when a left sub-instruction is issued to the instruction sequence for right sub-instructions, the sub-instructions are exchanged and processed in the sub cycle, and therefore a code-compressed program can be processed in such an execution sequence that is taken prior to compression.

Second Embodiment

Figure 4:
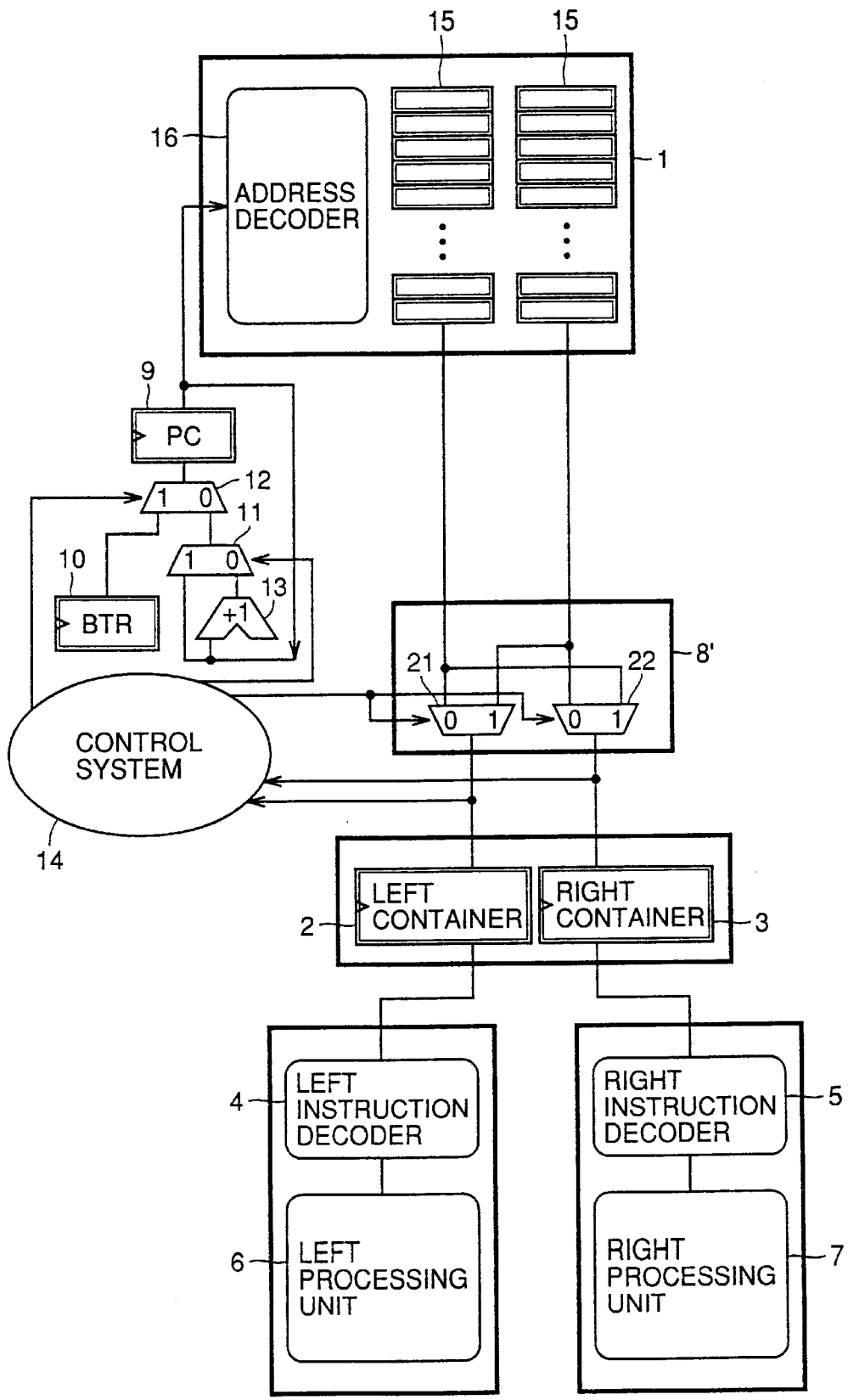
FIG. 4 is a block diagram showing a schematic structure of a VLIW processor in a second embodiment.

FIG. 4 is a block diagram showing a schematic structure of a VLIW processor in a second embodiment of the present invention. The only difference from the VLIW processor in the first embodiment shown in FIG. 3 is the structure of exchanging portion 8. Therefore, detailed description of overlapped structures and functions will not be repeated. In this embodiment, the reference numeral of the exchanging portion is 8'.

Exchanging portion 8' includes selectors 21 and 22. In the main cycle, control system 14 controls to selector 21 to select a sub-instruction, which belongs to the instruction sequence for left sub-instructions, from instruction memory 1, and selector 22 to select a sub-instruction, which belongs to the instruction sequence for right sub-instructions, from instruction memory 1. In the sub cycle, control system 14 controls selector 21 to select a sub-instruction, which belongs to the instruction sequence for right sub-instructions, from instruction memory 1, and selector 22 to select a sub-instruction, which belongs to the instruction sequence for left sub-instructions, from instruction memory 1.

The VLIW processor in the first embodiment shown in FIG. 3 detects a transition to the sub cycle at the decode stage, and causes sub-instructions held in left and right containers 2 and 3 to be fed back and swapped. At the decode stage, therefore, the value of program counter 9 has already be incremented and a VLIW instruction read from instruction memory 1 has been updated for the next step instruction. Thus, registers 17 and 18 are necessary to feed back and swap sub-instructions in left and right containers 2 and 3. Since the VLIW processor in this embodiment can control not to increment the value of program counter 9 by detecting a transition to the sub cycle at the instruction fetch stage, there is no need to feed back, eliminating the need for circuits corresponding to registers 17 and 18. In a processor in which an instruction fetch cycle is a critical path, however, the clock rate, that is, processing speed may be lowered.

As described above, according to the VLIW processor in this embodiment, a simple circuit structure and cost reduction can be attained compared with the VLIW processor in the fist embodiment.

Third Embodiment

A VLIW processor in a third embodiment of the present invention is the same as the VLIW processor structures in the first and second embodiments. The only difference is that the nop instruction of a left sub-instruction and the nop instruction of a light sub-instruction are supported in this embodiment. Therefore, detailed description of overlapped structures and functions will not be repeated.

Here, the nop instruction of a left sub-instruction is an Lnop instruction and the nop instruction of a right sub-instruction is an Rnop instruction. It is assumed as an example that a compressed code as in code example 6 below is described.
Code Example 6

| code number | instruction sequence for left sub-instructions | instruction sequence for right sub-instructions |
|---|---|---|
| 1 | Lnop | :Lnop |

When the VLIW processor in this embodiment executes the program of code example 6, the program is processed as shown in execution sequence example 3 below.
Execution Sequence Example 3

| step number | instruction sequence for left sub-instructions | instruction sequence for right sub-instructions |
|---|---|---|
| 1 | Lnop | :nop [Lnop] |
| 1' | Lnop | :nop [Lnop] |

As described above, according to the VLIW processor in this embodiment, execution corresponding to two cycles of nop instructions can be made possible by one VLIW instruction, and therefore code compression can be performed efficiently.

Fourth Embodiment

Figure 5:
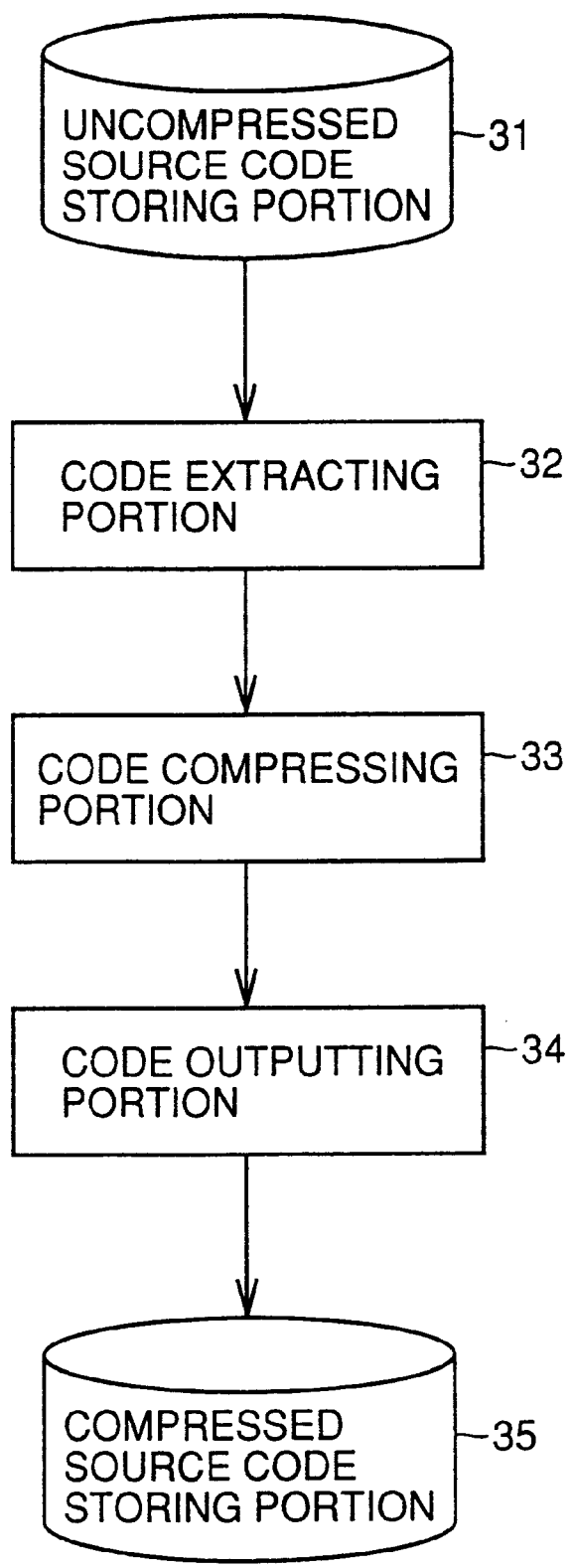
FIG. 5 is a block diagram showing a schematic structure of a code compression device in a fourth embodiment.

A fourth embodiment of the present invention relates to a code compression device (linker) which performs the above described code compression. FIG. 5 is a block diagram showing a schematic structure of the code compression device. The code compression device includes an uncompressed source code storing portion 31 which stores an uncompressed source code, a code extracting portion 32 which extracts two consecutive rows of VLIW instructions from the source code, a code compressing portion 33 which compresses the code extracted by code extracting portion 32, a code outputting portion 34 which outputs the compressed code, and a compressed source code storing portion 35 which stores the code output from code outputting portion 34.

Figure 6:
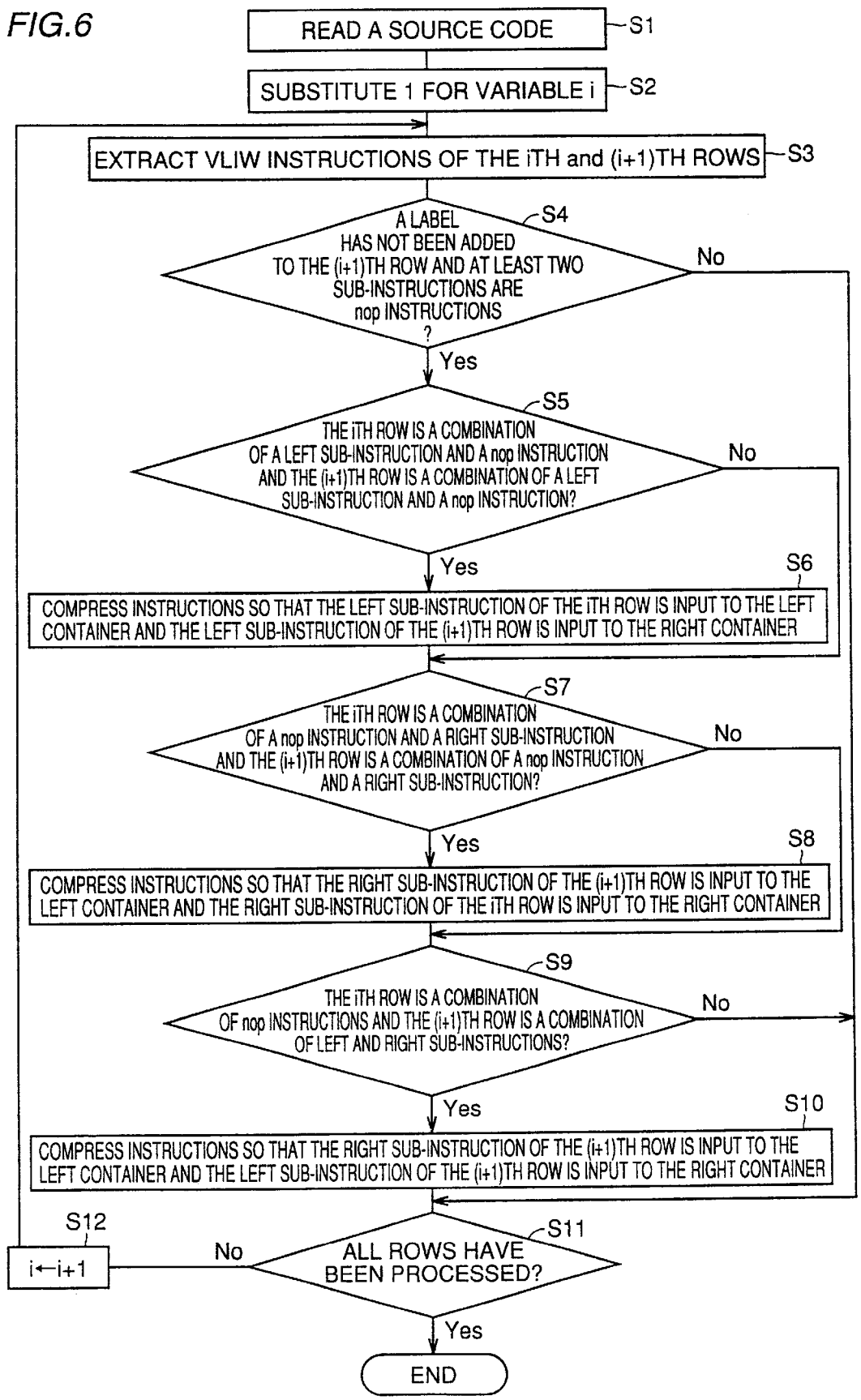
FIG. 6 is a flow chart for describing a processing procedure of the code compression device in the fourth embodiment.

FIG. 6 is a flow chart for describing the processing procedure of code compression. First, code extracting portion 32 reads a source code to be compressed from uncompressed source code storing portion 31 (S1), and "1" is set to a variable i (S2). Then, code extracting portion 32 extracts codes of the ith code and the (i+1)th rows from the source code (S3).

Thereafter, code compressing portion 33 determines if a label has not been added to the code of the (i+1)th row extracted by code extracting portion 32 and if at least two sub instructions of the codes of the ith and the (i+1)th rows are nop instructions (S4). If a label has been added to the code of the (i+1)th row, or if there is less than two sub-instructions, which are nop instructions, of the codes of the ith and the (i+1)th rows (S4, No), step S11 is entered.

If a label has not been added to the code of the (i+1)th row and at least two sub-instructions of the codes of the ith and the (i+1)th rows are nop instructions (S4, Yes), code compressing portion 33 determines if the code of the ith row is a combination of a left sub-instruction and a nop instruction and the code of the (i+1)th row is a combination of a left sub-instruction and a nop instruction (S5). If the ith row is not a combination of a left sub-instruction and a nop instruction, or if the (i+1)th row is not a combination of a left sub-instruction and a nop instruction (S5, No), step S7 is entered.

If the ith row is a combination of a left sub-instruction and a nop instruction and the (i+1)th row is a combination of a left sub-instruction and a nop instruction (S5, Yes), code compressing portion 33 compresses instructions so that the left sub-instruction of the ith row is input to left container 2 and the left sub-instruction of the (i+1)th row is input to right container 3 (S6). Then, code outputting portion 34 stores the compressed code into compressed source code storing portion 35.

In step S7, code compressing portion 33 determines if the ith row is a combination of a nop instruction and a right sub-instruction and the (i+1)th row is combination of a nop instruction and a right sub-instruction. If the ith row is not a combination of a nop instruction and a right sub-instruction, or if the (i+1)th row is not a combination of a nop instruction and a right sub-instruction (S7, No), step S9 is entered.

If the ith row is a combination of a nop instruction and a right sub-instruction and the (i+1)th row is a combination of a nop instruction and a right sub-instruction (S7, Yes), code compressing portion 33 compresses instructions so that the right sub-instruction of the (i+1)th row is input to left container 2 and the right sub-instruction of the ith row is input to right container 3 (S8). Then, code outputting portion 34 stores the compressed code into compressed source code storing portion 35.

In step S9, code compressing portion 33 determines if the ith row is a combination of a nop instruction and a nop instruction and the (i+1)th row is a combination of a left sub-instruction and a right sub-instruction. If the ith row is not a combination of nop instructions, or if the (i+1)th row is not a combination of left and right sub-instructions (S9, No), step S11 is entered.

If the ith row is a combination of nop instructions and the (i+1)th row is a combination of left and right sub-instructions (S9, Yes), code compressing portion 33 compresses instructions so that the right sub-instruction of the (i+1)th row is input to left container 2 and the left sub-instruction of the (i+1)th row is input to right container 3 (S10). Then, code outputting portion 34 stores the compressed code into compressed source code storing portion 35.

In step S11, a determination is made as to if compression processing has been performed for all rows of the source code (S11). If there is any row which has not been compressed (S11, No), (i+1) is substituted for variable i and the process returns to step S3. If compression has been performed for all rows (S11, Yes), the compression process is ended.

Figure 7:
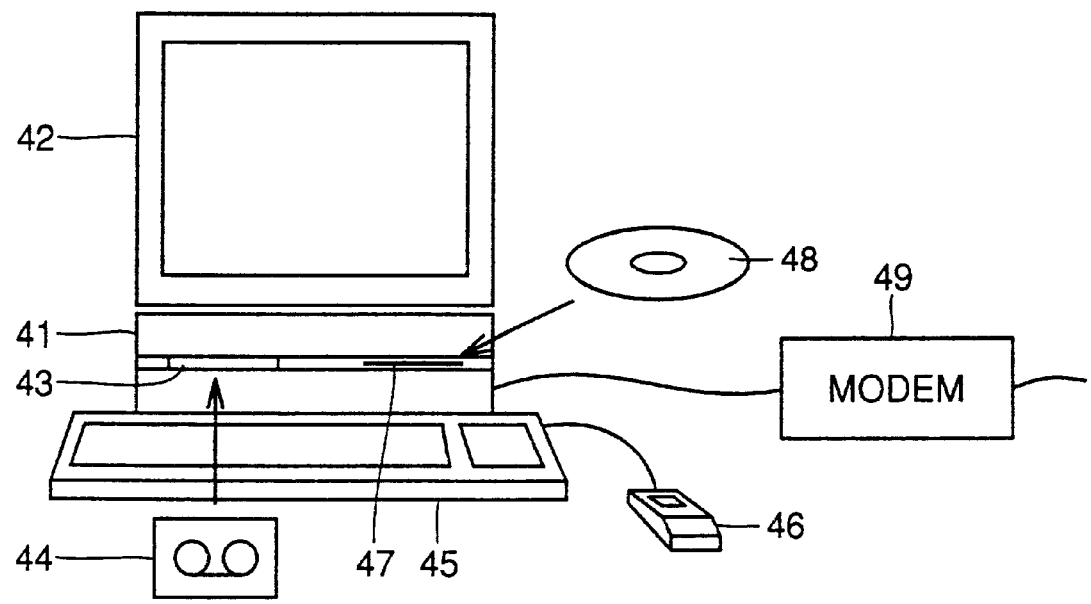
FIG. 7 shows an example of the external view of the code compression device in the fourth embodiment.

FIG. 7 shows an example of the external view of the code compression device according to the present invention. The code compression device includes a computer 41, a graphic display device 42, a magnetic tape device 43 in which a magnetic tape 44 is inserted, a keyboard 45, a mouse 46, a CD-ROM (Compact Disc-Read Only Memory) device 47 in which a CD-ROM 48 is inserted, and a communication modem 49. A code compression program is supplied by a storage medium such as magnetic tape 44 or CD-ROM 48. The code compression program is executed by computer 41, and an operator compresses source codes by operating keyboard 45 or mouse 46 while referring to graphic display device 42. The code compression program may be supplied to computer 41 from another computer via communication lines and communication modem 49.

Figure 8:
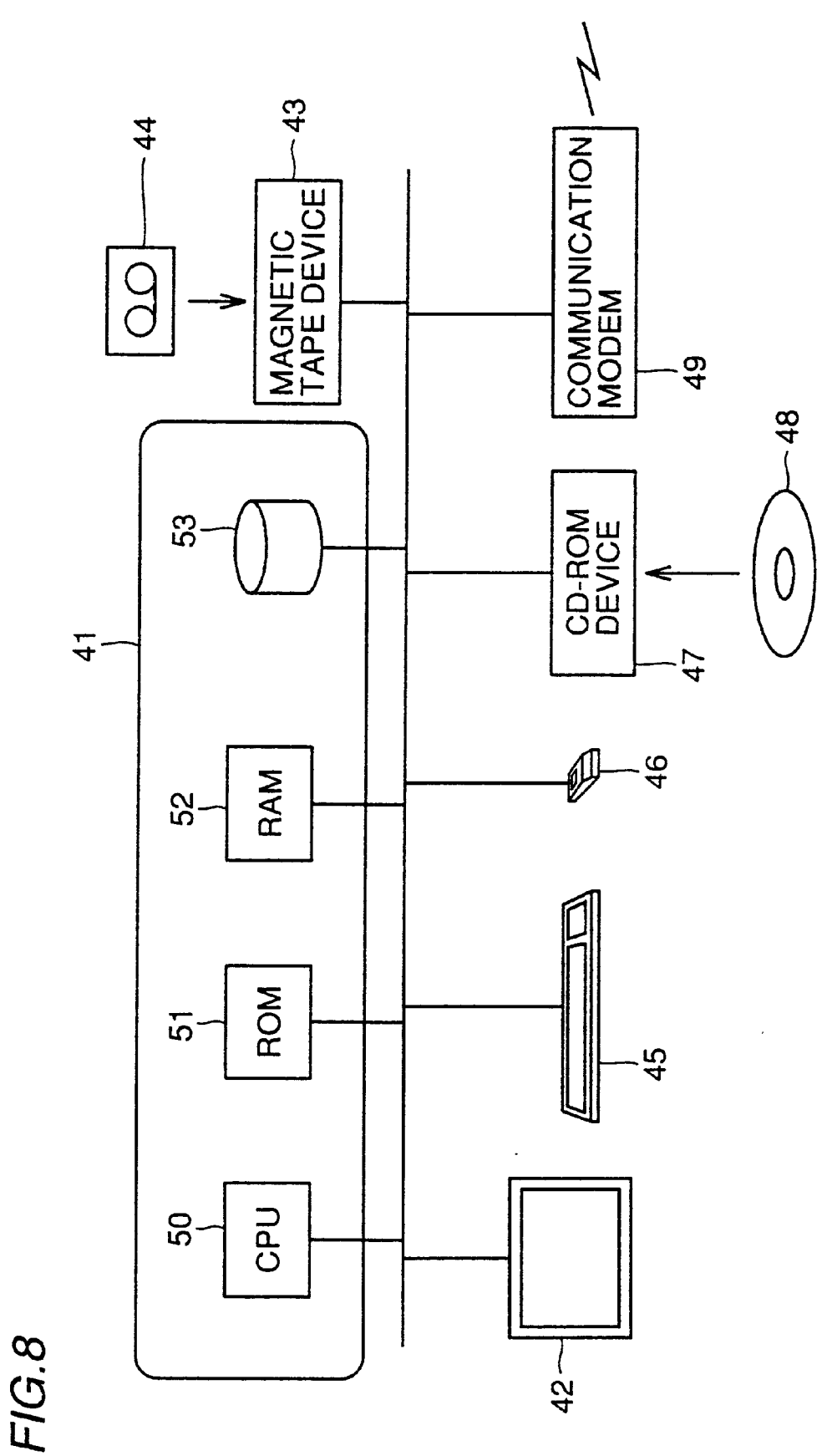
FIG. 8 is a schematic structure of computer 41 shown in FIG. 7.

FIG. 8 is a block diagram showing an example of the structure of the code compression device according to the present invention. Computer 41 shown in FIG. 7 includes a CPU 50, a ROM (Read Only Memory) 51, a RAM (Random Access Memory) 52, and a hard disc 53. CPU 50 carries out processing by transmitting and receiving data to and from magnetic tape device 43, keyboard 45, mouse 46, CD-ROM device 47, communication modem 49, ROM 51, RAM 52, or hard disc 53. A code compression program recorded on magnetic tape 44 or CD-ROM 48 is once stored in hard disc 53 via magnetic tape device 43 or CD-ROM device 47 by CPU 50. CPU 50 compresses a source code by loading the code compression program as necessary in RAM 52 for execution.

As described above, according to the code compression device in this embodiment, a source code can be compressed in a format which enables operation of the VLIW processor described in the first embodiment. Thus, capacity of an instruction memory, for example, can be used efficiently.

Fifth Embodiment

A code compression device in a fifth embodiment of the present invention is similar to the one in the fourth embodiment described with reference to FIGS. 5 to 8. Although data dependence is not considered for code compression in the code compression device in the fourth embodiment, data independence is taken into account in the code compression device in this embodiment (in this embodiment, a scheduler function is added to the code compression device in the fourth embodiment).

It is assumed as an example that the program of code example 7 below is described. code example 7

| code number | instruction sequence for left sub-instructions | instruction sequence for right sub-instructions |
| --- | --- | --- |
| 1 | store R0 → mem (200) | :sub R4, R5 → R6 |
| 2 | load mem (100) → R7 | :Rnop |
| 3 | Lnop | :add R1, R2 → R3 |

Since VLIW instructions shown in code numbers 2 and 3 do not have any data independence, the codes can be changed as in code example 8 below.
Code Example 8

| code number | instruction sequence for left sub-instructions | instruction sequence for right sub-instructions |
| --- | --- | --- |
| 1 | store R0 → mem (200) | :sub R4, R5 → R6 |
| 2 | Lnop | :Rnop |
| 3 | load mem (100) → R7 | :add R1, R2 → R3 |

The program shown in code example 8 can be compressed as in code example 9 below by the code compression device in the fourth embodiment.
Code Example 9

| code number | instruction sequence for left sub-instructions | instruction sequence for right sub-instructions |
| --- | --- | --- |
| 1 | store R0 → mem (200) | :sub R4, R5 → R6 |
| 2 | add R1, R2 → R3 | :load mem (100) → R7 |

When the program shown in code example 9 is executed, it is processed as shown in execution sequence example 4 below.
sequence example 4

| step number | instruction sequence for left sub-instructions | instruction sequence for right sub-instructions |
| --- | --- | --- |
| 1 | store R0 → mem (200) | :sub R4, R5 → R6 |
| 2 | nop [add R1, R2 → R3] | :nop [load mem (100) → R7] |
| 2' | load mem (100) → R7 | :add R1, R2 → R3 |

By thus carrying out scheduling while taking into account data independence, codes can be compressed more efficiently. The following code example 10 is an example of codes which cannot be compressed.
Code Example 10

| code number | instruction sequence for left sub-instructions | instruction sequence for right sub-instructions |
| --- | --- | --- |
| 1 | store R0 → mem (200) | :sub R4, R5 → R6 |
| 2 | load mem (100) → R1 | :Rnop |
| 3 | Lnop | :add R1, R2 → R3 |

Since the left sub-instruction of code number 2 "load mem (100)→R1" causes data to be loaded in register R1 and the right sub-instruction of code number 3 "add R1, R2→R3" causes data of register R1 to be referred, compression to the same VLIW instruction cannot be performed.

As described above, according to the code compression device in this embodiment, scheduling is carried out while taking into account data independence, codes can be compressed more efficiently compared with the code compression device in the fourth embodiment.

Sixth Embodiment

Figure 9:
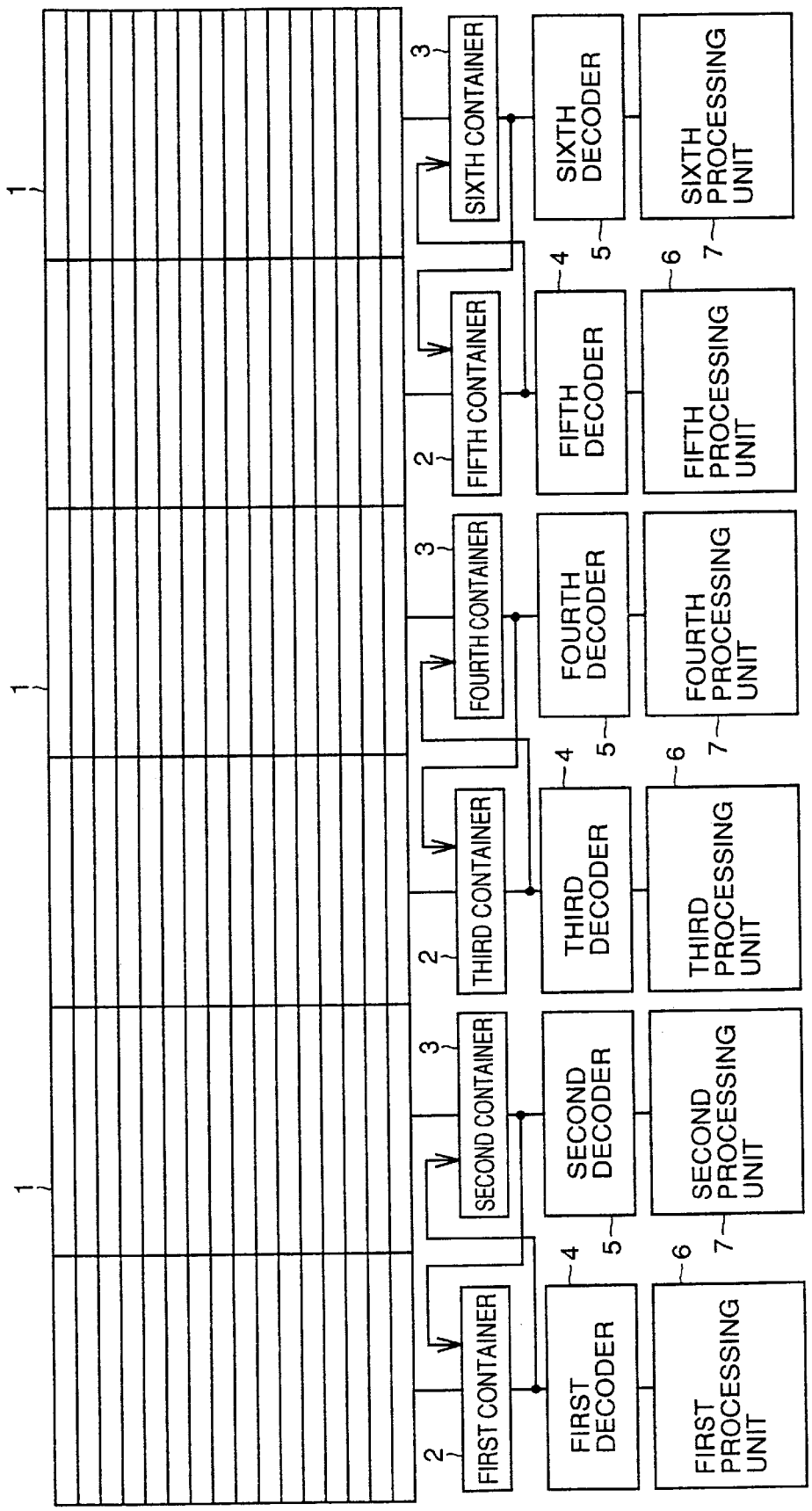
FIG. 9 schematically shows a VLIW processor in a sixth embodiment.

FIG. 9 schematically shows a VLIW processor in a sixth embodiment of the present invention. The VLIW processor in this embodiment has the structure formed by connecting a plurality of the VLIW processors in the first embodiment shown in FIG. 2, that is, the VLIW type processor in this embodiment is a 2n-way VLIW processor. FIG. 9 shows a VLIW processor when n=3.

As described above, the VLIW processor in this embodiment can have higher parallelism and processing speed than the VLIW processor in the first embodiment.

Seventh Embodiment

Figure 10:
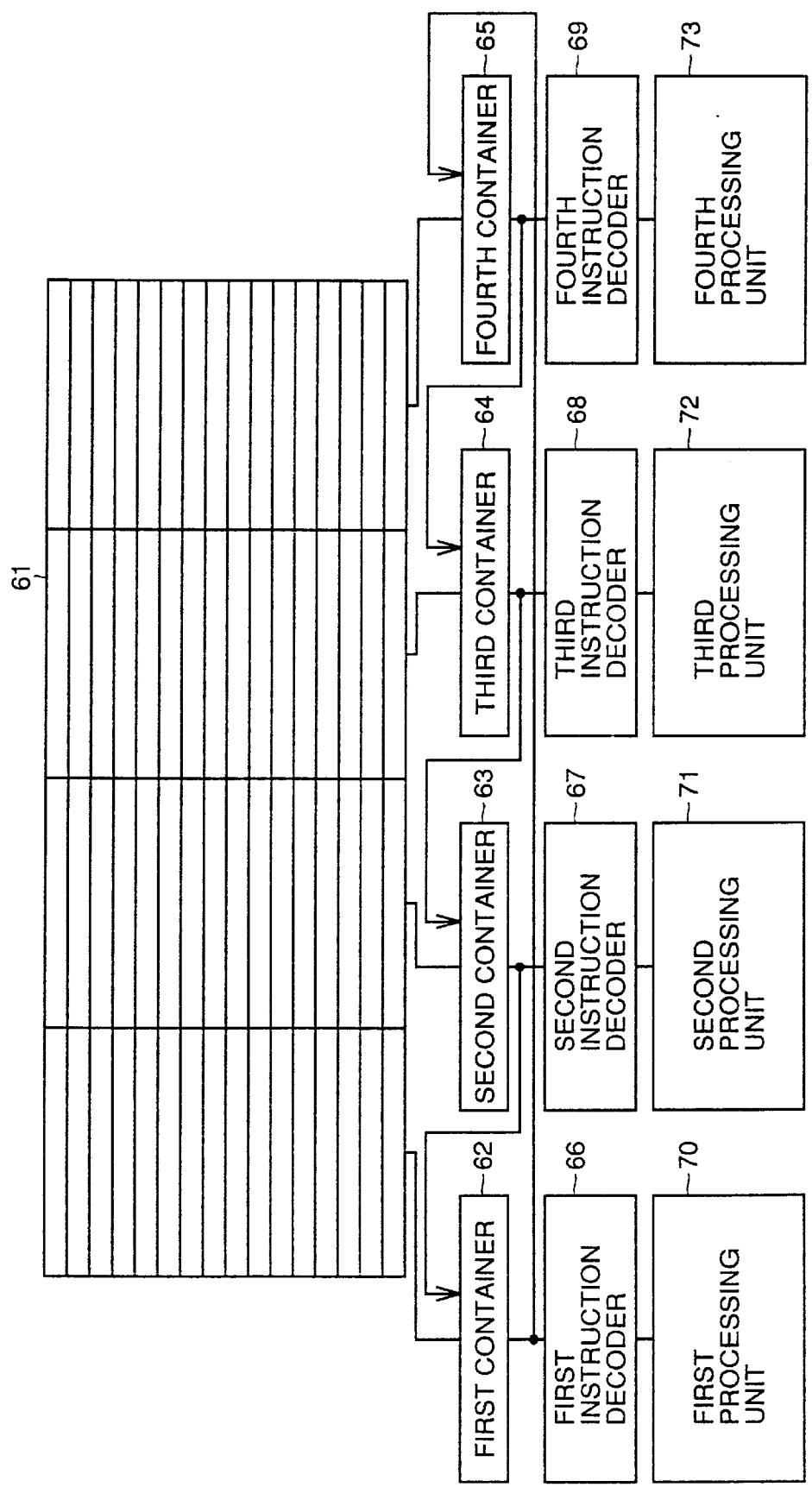
FIG. 10 schematically shows a VLIW processor in a seventh embodiment.

FIG. 10 schematically shows a VLIW processor in a seventh embodiment of the present invention. The VLIW processors in the first to sixth embodiments are the 2n-way VLIW processors which include two right and left sub-instructions, while the VLIW processor in this embodiment is based on the VLIW method of at least 3-ways which exchanges instructions by shifting them rather than exchanges instructions by swapping them.

The VLIW processor in this embodiment includes an instruction memory 61, a first container 62, a second container 63, a third container 64, a fourth container 65, a first instruction decoder 66, a second instruction decoder 67, a third instruction decoder 68, a fourth instruction decoder 69, a first processing unit 70, a second processing unit 71, a third processing unit 72, and a fourth processing 73. For processing, sub-instructions are shifted from first container 62 to fourth container 65, from fourth container 65 to third container 64, from third container 64 to second container 63, and from second container 63 to first container 62.

Figure 11:
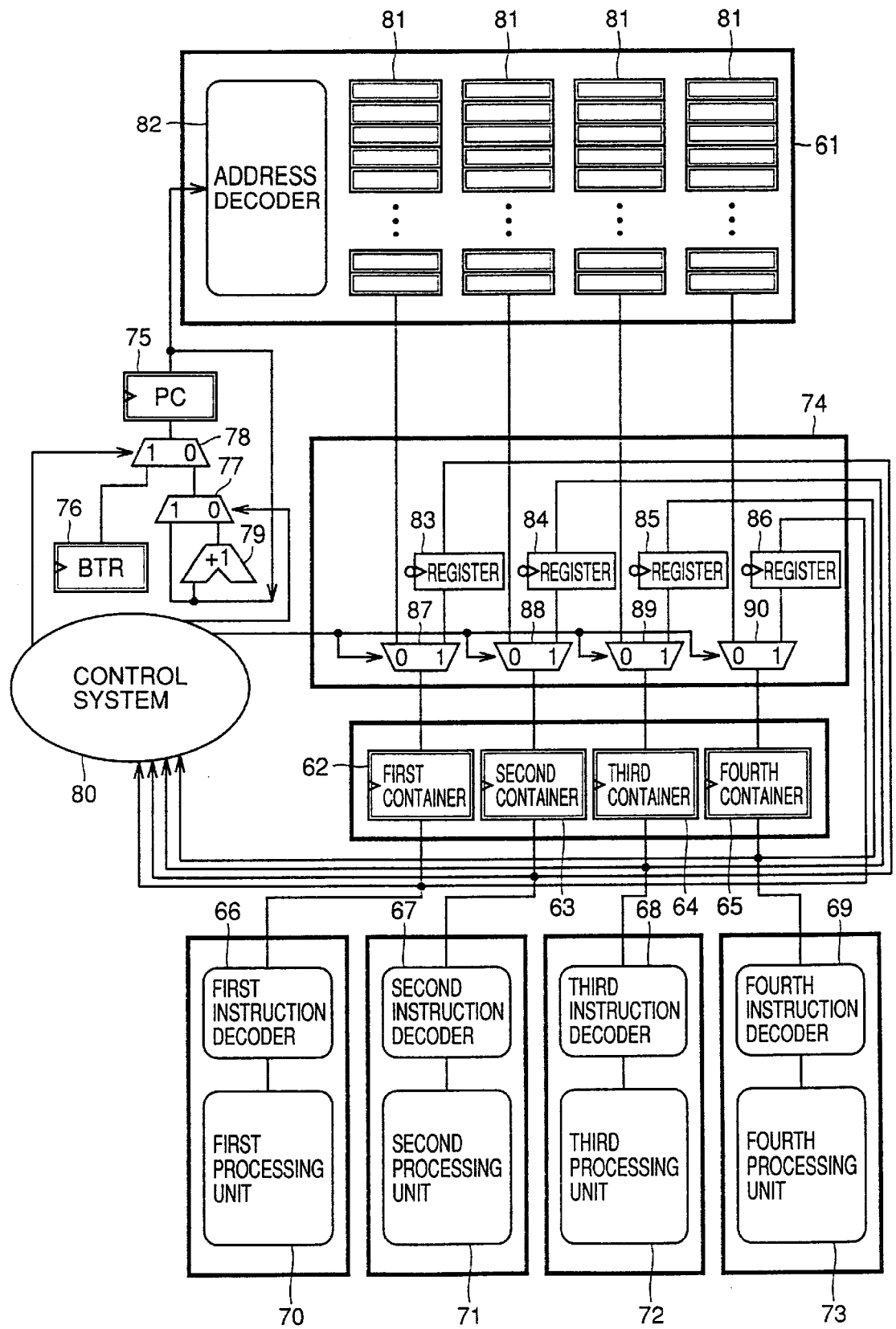
FIG. 11 shows a schematic structure of the VLIW processor in the seventh embodiment.

FIG. 11 is a block diagram showing a specific structure of the VLIW processor in this embodiment. The VLIW processor includes an instruction memory 61, a first container 62, a second container 63, a third container 64, a fourth container 65, a first instruction decoder 66, a second instruction decoder 67, a third instruction decoder 68, a fourth instruction decoder 69, a first processing unit 70, a second processing unit 71, a third processing unit 72, a fourth processing unit 73, an exchanging portion 74 which exchanges the contents of first to fourth containers 62 to 65 by sequentially shifting the contents, a program counter 75, a branch target register (BTR) 76, selectors 77 and 78, an incrementer 79, and a control system 80 which control the entire processor. Instruction memory 61 includes a plurality of memory cells 81, and an address decoder 82 which decodes the contents of program counter 75 to select memory cell 81. Exchanging portion 74 includes a register 83 which holds the contents of second container 63, a register 84 which holds the contents of third container 64, a register 85 which holds the contents of fourth container 65, a register 86 which holds the contents of first container 62, and selectors 87 to 90.

First to fourth containers 62 to 65, program counter 75 and branch address register 76 hold input signals at a rise of a clock signal not shown. Registers 83 to 86 hold input signals at a fall of the clock signal. When first to fourth containers 62 to 65 hold sub-instructions from instruction memory 1 in one cycle, therefore, they can shift and input the sub-instructions to corresponding containers in the next cycle.

For main cycle processing, control system 80 controls so that selector 77 selects the output of incrementer 79, selector 78 selects the output of selector 77, and selectors 87 to 90 select the outputs of instruction memory 1. For sub cycle processing, control system 80 controls so that selector 77 selects the output of program counter 75, selector 78 selects the output of selector 77, and selectors 87 to 90 select the outputs of registers 83 to 86, respectively.

It is assumed as an example that a programmer made the program of code example 11 below. code example 11

| code number | instruction sequence for first sub- instructions | instruction sequence for second sub- instructions | instruction sequence for third sub- instructions | instruction sequence for fourth sub- instructions |
|---|---|---|---|---|
| 1 | first sub-instruction 1 | :nop | :nop | :nop |
| 2 | first sub-instruction 2 | :nop | :nop | :nop |
| 3 | first sub-instruction 3 | :nop | :nop | :nop |
| 4 | first sub-instruction 4 | :nop | :nop | :nop |
| 5 | first sub-instruction 5 | :second sub- instruction 6 | :nop | :fourth sub- instruction 7 |

When the program of code example 11 is compressed, it is described code example 12 below.
Code Example 12

| code number | instruction sequence for first sub- instructions | instruction sequence for second sub- instructions | instruction sequence for third sub- instructions | instruction sequence for fourth sub- instructions |
|---|---|---|---|---|
| 1 | first sub-instruction 1 | :first sub- instruction 2 | :first sub- instruction 3 | :first sub- instruction 4 |
| 2 | first sub-instruction 5 | :second sub- instruction 6 | :nop | :fourth sub- instruction 7 |

When the program shown in code example 12 is executed by the processor in this embodiment, it is processed as in execution sequence example 5 below.
Execution Sequence Example 5

| step number | instruction sequence for first sub- instructions | instruction sequence for second sub- instructions | instruction sequence for third sub- instructions | instruction sequence for fourth sub- instructions |
|---|---|---|---|---|
| 1 | first sub- instruction 1 | :nop [first sub- instruction 2] | :nop [first sub- instruction 3] | :nop [first sub-instruction 4] |
| 1' | first sub- instruction 2 | :nop [first sub- instruction 3] | :nop [first sub- instruction 4] | :nop [first sub-instruction 1] |
| 1" | first sub- instruction 3 | :nop [first sub- instruction 4] | :nop [first sub- instruction 1] | :nop [first sub- instruction 2] |
| 1'" | first sub- instruction 4 | :nop [first sub- instruction 1] | :nop [first sub- instruction 2] | :nop [first sub- instruction 3] |
| 2 | first sub- instruction 5 | :second sub- instruction 6 | :nop | :fourth sub- instruction 7 |

As described above, according to the VLIW processor in this embodiment, the VLIW method of at least 3-ways can be applied, and codes can be compressed more efficiently compared with the 2n-way VLIW processor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A VLIW processor, comprising:

a plurality of containers, each of which being configured to hold a sub-instruction;

an exchanging portion configured to switch sub-instructions held by said plurality of containers;

a plurality of decoders connected to said plurality of containers; and a plurality of processing units connected to said plurality of decoders.

2. The VLIW processor according to claim 1, wherein said plurality of containers include a left container holding a first instruction in a VLIW instruction, and a right container holding a second instruction in said VLIW instruction, said plurality of decoders include a left instruction decoder decoding the first instruction held in said left container, and a right decoder decoding the second instruction held in said right container, said plurality of processing units include a left processing unit executing instructions decoded by said left instruction decoder, and a right processing unit executing instructions decoded by said right instruction decoder, said left instruction decoder decodes a left sub-instruction and outputs the decoded left sub-instruction to said left processing unit when said first instruction is the left sub-instruction, and outputs a right sub-instruction as a nop instruction when said first instruction is the right sub-instruction, and said right instruction decoder decodes a right sub-instruction and outputs the decoded right sub-instruction to said right processing unit when said second instruction is the right sub-instruction, and outputs a left sub-instruction as a nop instruction when said second instruction is the left sub-instruction.

3. The VLIW processor according to claim 2, further comprising:

a program counter outputting an address to fetch a VLIW instruction, wherein in at least one of the cases when said first instruction is a right sub-instruction and when said second instruction is a left sub-instruction, said left instruction decoder decodes said first instruction and said right instruction decoder decodes said second instruction in a main cycle, in a sub cycle, said left instruction decoder decodes said second instruction exchanged by said exchanging portion and said right instruction decoder decodes said first instruction exchanged by said exchanging portion, and said program counter increments a program counter value during said main cycle processing, and keeps the program counter value unchanged during said sub cycle processing.

4. The VLIW processor according to claim 3, wherein said program counter includes a branch target register holding a branch target address, and said program counter preferentially outputs a value of said branch target register if branching is found before said sub cycle.

5. The VLIW processor according to claim 3, wherein said exchanging portion includes
a first selector selecting said first instruction in said main cycle and said second instruction in said sub cycle and outputting the instructions selected by the first selector to said left container, and
a second selector selecting said second instruction in said main cycle and said first instruction in said sub cycle and outputting the instructions selected by the second selector to said right container.

6. The VLIW processor according to claim 2, wherein said exchanging portion includes
a first register holding the first instruction held by said left container and outputting the first instruction to said right container, and
a second register holding the second instruction held by said right container and outputting the second instruction to said left container.

7. The VLIW processor according to claim 1, wherein said exchanging portion sequentially shifts a plurality of sub-instructions held in said plurality of containers and input the plurality of sub-instructions to said plurality of containers.

8. The VLIW processor according to claim 1, wherein said plurality of containers include a (2i−1)th container holding a (2i−1)th sub-instruction in said VLIW instruction, and a (2i)th container holding a (2i)th sub-instruction in said VLIW instruction, with i being a natural number 1 to n,
said plurality of decoders include a (2i−1)th decoder decoding the (2i−1)th sub-instruction held in said (2i−1)th container, and a (2i)th decoder decoding the (2i)th sub-instruction held in said (2i)th container,
said plurality of processing units include a (2i−1)th processing unit executing instructions decoded by said (2i−1)th decoder, and a (2i)th processing unit executing instructions decoded by said (2i)th decoder, and
said exchanging portion exchanges the (2i−1)th sub-instruction held in said (2i−1)th container and the (2i)th sub-instruction held in said (2i)th container.

9. A code compression device, comprising:
an extracting portion configure for extracting consecutive VLIW instructions from a source code, each VLIW instruction including a plurality of instructions, and each of the plurality of instructions being a nop instruction or a sub-instruction specifying an operation; and
a compressing portion, responsive to said consecutive VLIW instructions including at least one nop instruction, selectively compressing said consecutive VLIW instructions based on the number of nop instructions included in the consecutive VLIW instructions extracted by said extracting portion.

10. The code compression device according to claim 9, wherein
when an ith row of the VLIW instructions includes a left sub-instruction instruction and a nop instruction and an (i+1)th row of the VLIW instructions includes a left sub-instruction and a nop instruction with i being a natural number 1 to n, said compressing portion compresses the VLIW instructions to one VLIW instruction by describing the left sub-instruction included in said ith row of the VLIW instructions to an instruction sequence for left sub-instructions and describing the left sub-instruction included in said (i+1)th row of the VLIW instructions to an instruction sequence for right sub-instructions.

11. The code compression device according to claim 9, wherein
when an ith row of the VLIW instructions includes a nop instruction and a right sub-instruction and an (i+1)th row of the VLIW instructions includes a nop instruction and a right sub-instruction with i being a natural number 1 to n, said compressing portion compresses the VLIW instructions to one VLIW instruction by describing the right sub-instruction included in said (i+1)th row of the VLIW instructions to an instruction sequence for left sub-instructions and describing the right sub-instruction included in said ith row of the VLIW instructions to an instruction sequence for right sub-instructions.

12. The code compression device according to claim 9, wherein
when an ith row of the VLIW instructions includes nop instructions and an (i+1)th row of the VLIW instructions includes left and right sub-instructions with i being a natural number 1 to n, said compressing portion compresses the VLIW instructions to one VLIW instruction by describing the right sub-instruction included in said (i+1)th row of the VLIW instructions to an instruction sequence for left sub-instructions and describing the left sub-instruction included in said (i+1)th row of the VLIW instructions to an instruction sequence for right sub-instructions.

13. The code compression device according to claim 9, wherein
said compressing portion compresses codes by considering data independence between codes in said source code.

14. A medium on which a code compression program is recorded, the program comprising the steps of:
extracting consecutive VLIW instructions from a source code, each VLIW instruction including a plurality of instructions, and each of the plurality of instructions being a nop instruction or a sub-instruction specifying an operation; and
responsive to said consecutive VLIW instructions including at least one nop instruction, selectively compressing said consecutive VLIW instructions based on the number of nop instructions included in said VLIW instructions.

15. A medium on which a code compression program is recorded, the program comprising the steps of:
extracting consecutive VLIW instructions from a source code; and
compressing said consecutive VLIW instructions based on a nop instruction included in said extracted consecutive VLIW instructions;
wherein when an ith row of the VLIW instructions includes a left sub-instruction and a nop instruction and an (i+1)th row of the VLIW instructions includes a left sub-instruction and a nop instruction with i being a natural number 1 to n, said compressing step includes a step of compressing the VLIW instructions to one VLIW instruction by describing the left sub-instruction included in said ith row of the VLIW instructions to an instruction sequence for left sub-instructions and describing the left sub-instruction included in said (i+1)th row of the VLIW instructions to an instruction sequence for right sub-instructions.

16. A medium on which a code compression program is recorded, the program comprising the steps of:
extracting consecutive VLIW instructions from a source code; and compressing said consecutive VLIW instructions based on a nop instruction included in said extracted consecutive VLIW instructions;

wherein when an ith row of the VLIW instructions includes a nop instruction and a right sub-instruction and an (i+1)th row of the VLIW instructions includes a nop instruction and a right sub-instruction with i being a natural number 1 to n, said compressing step includes a step of compressing the VLIW instructions to one VLIW instruction by describing the right sub-instruction included in said (i+1)th of the VLIW instructions to an instruction sequence for left sub-instructions and describing the right sub-instruction included in said ith row of the VLIW instructions to an instruction sequence for right sub-instructions.

17. A medium on which a code compression program is recorded, the program comprising the steps of:

extracting consecutive VLIW instructions from a source code; and compressing said consecutive VLIW instructions based on a nop instruction included in said extracted consecutive VLIW instructions;

wherein when an ith row of the VLIW instructions includes nop instructions and an (i+1)th row of the VLIW instructions includes left and right sub-instructions with i being a natural number 1 to n, said compressing step includes a step of compressing the VLIW instructions to one VLIW instruction by describing the right sub-instruction included in said (i+1)th row of the VLIW instructions to an instruction sequence for left sub-instructions and describing the left sub-instruction included in said (i+1)th row of the VLIW instructions to an instruction sequence for right sub-instructions.

18. A medium on which a code compression program is recorded, the program comprising the steps of:

extracting consecutive VLIW instructions from a source code; and compressing said consecutive VLIW instructions based on a nop instruction included in said extracted consecutive VLIW instructions;

wherein said compressing step includes a step of compressing codes by considering data independence between codes in said source code.

* * * * *